Jan. 4, 1927.

H. C. KITTELSON

CHAIN FASTENER

Filed Oct. 17, 1924

1,613,278

H. C. Kittelson
INVENTOR

BY Victor J. Evans
ATTORNEY

WITNESS:

Patented Jan. 4, 1927.

1,613,278

UNITED STATES PATENT OFFICE.

HALMER C. KITTELSON, OF MINNEAPOLIS, MINNESOTA; JOSEPH O. ESTREM, ADMINISTRATOR OF SAID HALMER C. KITTELSON, DECEASED, ASSIGNOR TO STANDARD CHAIN COMPANY, INC., OF MINNEAPOLIS, MINNESOTA, A CORPORATION OF MINNESOTA.

CHAIN FASTENER.

Application filed October 17, 1924. Serial No. 744,233.

This invention relates to improvements in chain fastening devices especially adapted for connecting the ends of non-skid chains for tires, an object being to provide a device by means of which the ends of the chain may be drawn together and securely held in connected condition without the use of springs or other resilient fastening devices.

Another object of the invention is the provision of a chain fastener which is simple in construction, easily manipulated and in which danger of accidental unfastening is reduced to a minimum.

With the above and other objects in view, the invention further includes the following novel features and details of construction, to be hereinafter more fully described, illustrated in the accompanying drawings and pointed out in the appended claims.

In the drawings:—

Figure 1:
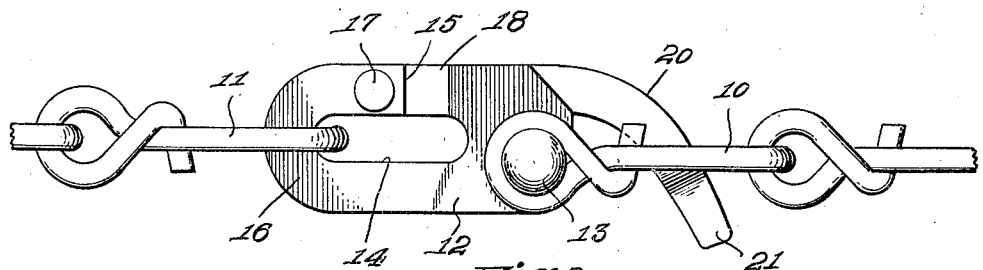
Figure 1 is a side elevation of a chain fastener constructed in accordance with the invention and shown as connecting the ends of a chain.
Figure 2:
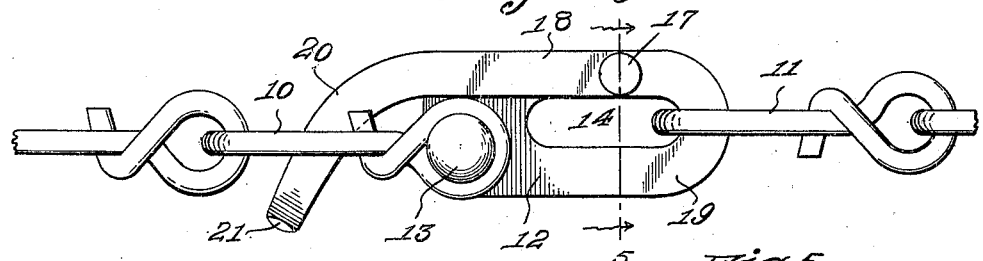
Figure 2 is a similar view looking at the side opposite to that shown in Figure 1.

Referring to the drawings in detail wherein like characters of reference denote corresponding parts, the reference character 10 indicates one end of one of the side chains of a non-skid tire chain, the other end of the said chain being indicated at 11. These chains may be of the usual type with the link 10 permanently connected to the chain fastener while the link at the opposite end of the chain is detachably connected.

The fastener comprises a body member 12 which is pivotally secured to the link at the end 10 of the chain as shown at 13. This body member 12 is provided with a substantially L-shaped slot 14, one arm of which extends longitudinally of the body member while the other arm extends transversely and opens at one side edge of the said body member so as to provide an entrance opening 15. A hook 16 is thus formed at one end of the body member 12 which is adapted to engage the link at the end 11 of the chain.

Pivotally secured to the bill of the hook 16 as shown at 17 is a locking lever 18, the latter being provided at one end with a hook 19 which is also adapted to engage the link at the end 11 of the chain. The opposite end of the lever 18 is provided with a curved portion 20 and with a laterally extending extremity 21.

Figures 3, 5:
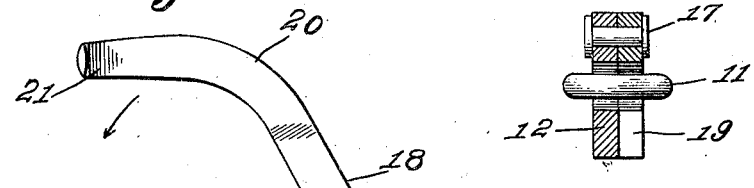
Figure 3 is a fragmentary elevation with the connector partly open.
Figure 5 is a section on the line 5—5 of Figure 2.
Figure 4:
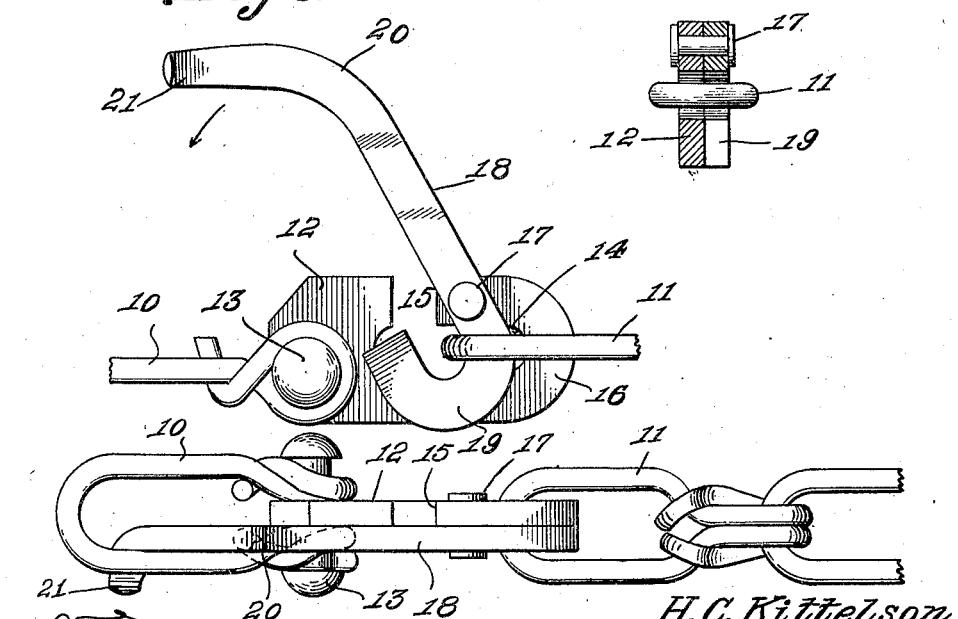
Figure 4 is a plan view of the connector as shown in Figure 2.

The hook 19 controls the entrance opening 15 and by inserting the curved portion 20 through the link 11, the ends of the chain may be drawn together when the locking lever 18 is moved pivotally, the movement directing the link 11 into the L-shaped slot 14 so that the hook 16 is passed through the said link. A further downward movement of the lever 18 in the direction of the arrow shown in Figure 3 will permit of the end 20 of the lever 18 being inserted in the link 10 so that the offset extremity 21 will engage one of the side bars of the said link as shown in Figure 4 of the drawings and hold the lever against accidental movement with the said lever closing the entrance opening 15.

The invention is susceptible of various changes in its form, proportions and minor details of construction and the right is herein reserved to make such changes as properly fall within the scope of the appended claims.

Having described the invention what is claimed is:—

1. A connecting device for tire chains having in combination, an elongated plate member of single thickness pivoted adjacent one end to one end of said chain, said member having an oblong slot extending longitudinally therethrough having its top side rectilinear and having a lateral slot extending from one edge into said top side of said oblong slot between the ends thereof and adjacent one of said ends whereby portions of said oblong slot are disposed at each side of said lateral slot, a second hook-like plate member of single thickness pivoted to said first mentioned member and having long and short arms with a slot therebetween, the inner side of said long arm being rectilinear and adapted to extend across the top side of said oblong slot when the device is in closed position and to substantially register with said top side, said long arm extending along the top of said first mentioned member and across said lateral slot and projecting beyond the attached end of said first mentioned member, and having a chain engaging means at its free end.

2. The structure set forth in claim 1, the pivot connecting said members being disposed adjacent said lateral slot and passing through said long arm of said second member, the axis of said pivot being substantially the same distance from the remote side of the slot between said long and short arms and from the remote side of said lateral slot whereby when said long arm is swung to position substantially at right angles to the longitudinal axis of said first mentioned member, the slot between said long and short arms will substantially register with said lateral slot.

3. The structure set forth in claim 1, said long arm engaging the connected end of the chain as a stop when the device is in closed position with said long arm extending substantially parallel to the longitudinal axis of said first mentioned member.

In testimony whereof I affix my signature.

HALMER C. KITTELSON.